(12) United States Patent
Chitiveli et al.

(10) Patent No.: US 8,150,843 B2
(45) Date of Patent: Apr. 3, 2012

(54) GENERATING SEARCH RESULTS BASED ON USER FEEDBACK

(75) Inventors: Srinivas Varma Chitiveli, Germantown, MD (US); Barton Wayne Emanuel, Manassas, VA (US); Alexander Wolcott Holt, New Paltz, NY (US); Michael E. Moran, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 12/497,463

(22) Filed: Jul. 2, 2009

(65) Prior Publication Data

US 2011/0004609 A1 Jan. 6, 2011

(51) Int. Cl.
G06F 7/00 (2006.01)
G06F 17/30 (2006.01)
G06F 13/14 (2006.01)

(52) U.S. Cl. .................. 707/723; 707/705; 707/722

(58) Field of Classification Search ............. 707/5, 706, 707/711, 722–723, 728, 748, 759, 765, 769
See application file for complete search history.

(56) References Cited

U.S. PATENT DOCUMENTS

| | | | |
|---|---|---|---|
| 5,963,940 A | 10/1999 | Liddy et al. | |
| 6,574,622 B1 | 6/2003 | Miyauchi et al. | |
| 6,745,181 B1 | 6/2004 | Chang et al. | |
| 6,954,750 B2 | 10/2005 | Bradford | |
| 7,089,236 B1 | 8/2006 | Stibel | |
| 7,177,818 B2 | 2/2007 | Nair | |
| 7,376,640 B1 | 5/2008 | Anderson et al. | |
| 7,406,459 B2 | 7/2008 | Chen et al. | |
| 7,529,736 B2 * | 5/2009 | Katariya et al. ............ 1/1 |
| 2002/0099701 A1 | 7/2002 | Rippich | |
| 2003/0115187 A1 | 6/2003 | Bode et al. | |
| 2004/0260534 A1 | 12/2004 | Pak et al. | |
| 2005/0033711 A1 | 2/2005 | Horvitz et al. | |
| 2005/0071465 A1 | 3/2005 | Zeng et al. | |
| 2005/0240580 A1 | 10/2005 | Zamir et al. | |
| 2006/0026147 A1 | 2/2006 | Cone et al. | |
| 2006/0195440 A1 | 8/2006 | Burges et al. | |
| 2007/0016553 A1 | 1/2007 | Dumais et al. | |
| 2007/0192166 A1 | 8/2007 | Van Luchene | |
| 2007/0192293 A1 | 8/2007 | Swen | |
| 2007/0203888 A1 | 8/2007 | Wang et al. | |
| 2007/0219988 A1 | 9/2007 | Mueller et al. | |
| 2008/0071772 A1 | 3/2008 | Rosenoff et al. | |
| 2008/0114751 A1 | 5/2008 | Cramer et al. | |
| 2009/0094232 A1 * | 4/2009 | Marvit et al. .............. 707/5 |
| 2009/0313239 A1 * | 12/2009 | Wen et al. ................ 707/5 |

FOREIGN PATENT DOCUMENTS

CN 101093509 12/2007

* cited by examiner

*Primary Examiner* — Cam-Y Truong
*Assistant Examiner* — Cecile Vo
(74) *Attorney, Agent, or Firm* — Patterson & Sheridan, LLP

(57) ABSTRACT

Systems, methods and articles of manufacture are disclosed for generating search results based on user feedback. A request may be received to generate search results retrieved using a search string. The request may include user feedback for one or more selected documents of the search results. Improved search results may be generated based on the search results and the feedback for one or more selected documents of the search results. The improved search results may be output to a graphical display device.

24 Claims, 4 Drawing Sheets

GENERATING SEARCH RESULTS BASED ON USER FEEDBACK

BACKGROUND OF THE INVENTION

1. Field of the Invention

The field of the invention relates to search engines. More specifically, the field of the invention relates to generating search results based on user feedback.

2. Description of the Related Art

A search engine typically runs over a predefined collection of documents, returning all documents that match a string of search terms. To obtain desired information, a user typically submits a string including only a few search terms (such as one or two search terms). When the string includes only a few search terms, the search engine may return a large number of documents in response to the string. Further, even when the string includes many search terms, the search engine may nevertheless return a large number of documents when the predefined collection of documents is large (e.g., when the predefined collection of documents is the World Wide Web).

From a perspective of the user, not all of the returned documents may be relevant (or be of equal relevance) to the string of search terms. Further, the user may need to sift through many of the returned documents (including relevant documents and irrelevant documents) before the user obtains the desired information. For instance, the search engine may organize returned documents into pages, each page including ten returned documents. In such a case, the user may peruse several pages before obtaining the desired information. Further, it may not be feasible for the user to sift through all (or even most) of the returned documents when the number of returned documents is large.

SUMMARY OF THE INVENTION

Embodiments of the invention include a computer-implemented method for processing search results. The method may include configuring one or more processors to perform an operation. The operation itself may generally include receiving an initial set of search results. The initial set of search identifies a plurality of documents responsive to a search request, ranked in an initial ordering. The operation may also include receiving a selection of one or more documents from the plurality of documents and training a classifier using each selected document as a training example. For example, the selection of one or more documents from the plurality of documents may identify documents relevant (or not relevant) to what the user is actually searching for. And these documents may be used as positive and negative training examples to train the classifier. The operation may also include supplying one or more of the plurality of documents responsive to the search request documents to the trained classifier to obtain a measure of similarity between each document supplied to the trained classifier and a document category represented by the selected documents. The operation may also include re-ranking the initial ordering of each document having a measure of similarity which exceeds a specified threshold and presenting the re-ranked search results to a user on a graphical display device. For example, each document having a measure of similarity which exceeds a specified threshold may be ranked ahead of other documents in the initial search result.

Another embodiment of the invention includes a computer program product, the computer program product comprising a computer usable medium having computer usable program code for processing search results. The code may generally be configured for receiving an initial set of search results. The initial set of search identifies a plurality of documents responsive to a search request, ranked in an initial ordering. The code may be further configured for receiving a selection of one or more documents from the plurality of documents and training a classifier using each selected document as a training example. The code may be further configured for supplying one or more of the plurality of documents responsive to the search request documents to the trained classifier to obtain a measure of similarity between each document supplied to the trained classifier and a document category represented by the selected documents. The code may be further configured for further configured for re-ranking the initial ordering of each document having a measure of similarity which exceeds a specified threshold and presenting the re-ranked search results to a user on a graphical display device.

Still another embodiment of the invention includes a system having a processor and a memory containing an application program configured for processing search results, which, when executed on the processor is configured to perform an operation. The operation itself may generally include receiving an initial set of search results. The initial set of search identifies a plurality of documents responsive to a search request, ranked in an initial ordering. The operation may also include receiving a selection of one or more documents from the plurality of documents and training a classifier using each selected document as a training example. The operation may also include supplying one or more of the plurality of documents responsive to the search request documents to the trained classifier to obtain a measure of similarity between each document supplied to the trained classifier and a document category represented by the selected documents. The operation may also include re-ranking the initial ordering of each document having a measure of similarity which exceeds a specified threshold and presenting the re-ranked search results to a user on a graphical display device.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
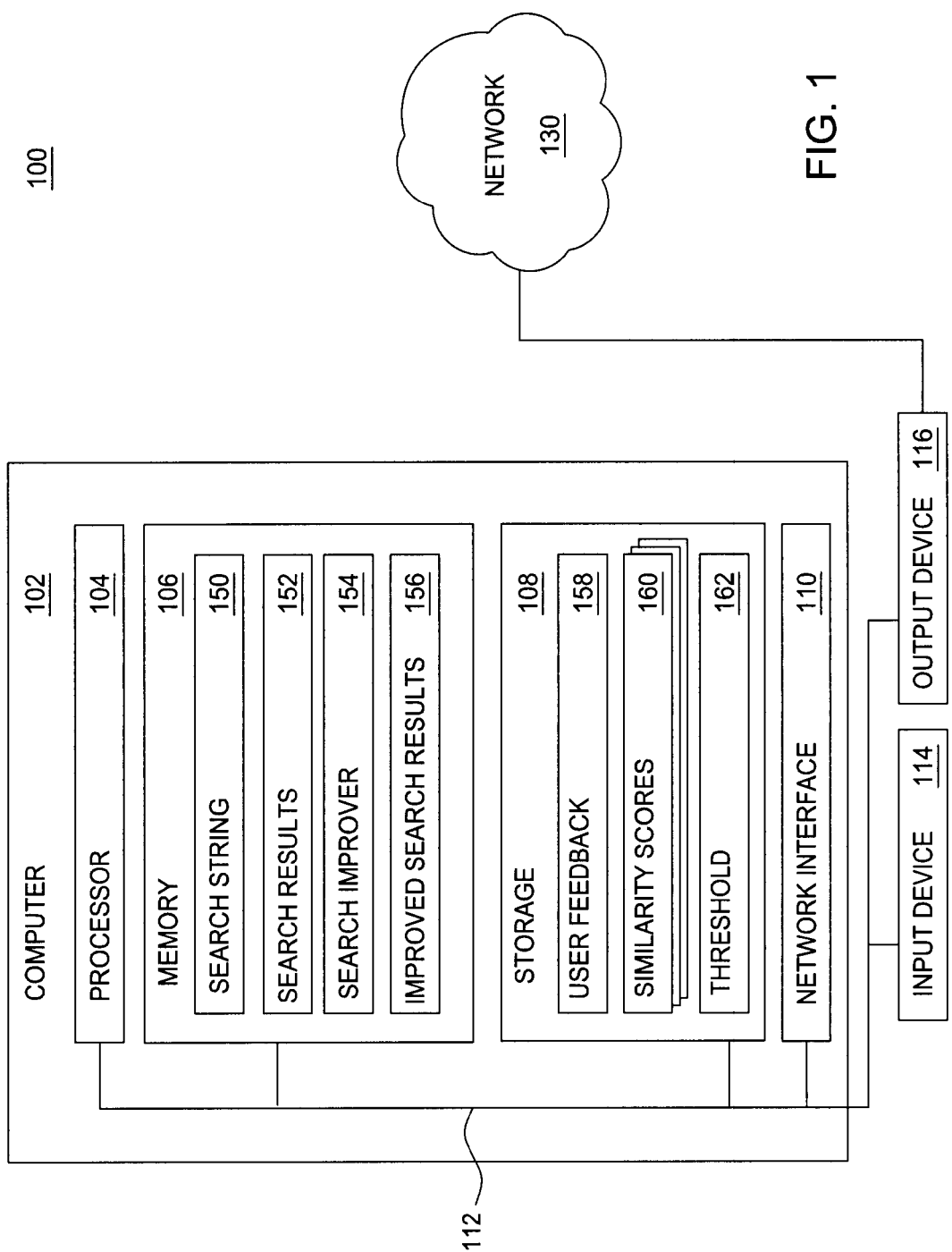
FIG. 1 is a block diagram illustrating a system for improving search results based on user feedback, according to one embodiment of the invention.

Embodiments of the invention generate search results based on user feedback for an initial set of search results. In one embodiment, a search engine may be configured to refine what search results are returned for a given set of search terms. For example, a user may supply the search terms and the search engine may provide an initial set of search results, i.e., a set of documents which include the search terms in an ordering selected by the search engine. The user may identify a group of documents in the initial set of search results that correspond well to what the user is searching for. The search engine may reorder the search results using the content of documents identified by the user. For example, the search engine may train a classifier using the documents identified by the user and then evaluate other documents (in the initial search results or otherwise) using the trained classifier. The classifier may be generally configured to provide a measure of similarity corresponding to how well a given input document "matches" a category represented by the documents used to train the classifier and to return an ordering of search results based on the measure of similarity. That is, the classifier is used to dynamically categorize and re-rank documents based on an immediate selection of sample documents from the results. Doing so helps provide a user with ordered search results where the most highly ranked documents are similar in content to the set of documents selected by the user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention may be part of an operating system or a specific application, component, program, module, object, or sequence of instructions. Computer programs implementing an embodiment of the present invention typically include instructions translated by the native computer into a machine-readable format and hence executable instructions. Also, such programs typically include a variety of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for improving search results based on user feedback, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a search string 150, search results 152, a search improver 154, and improved search results 156. Further, the storage 108 of the computer 102 includes user feedback 158, similarity scores 160, and a threshold 162. FIGS. 2 through 5 and associated descriptions detail the structure and operation of the search improver 154 running on the computer 102.

Figure 2:
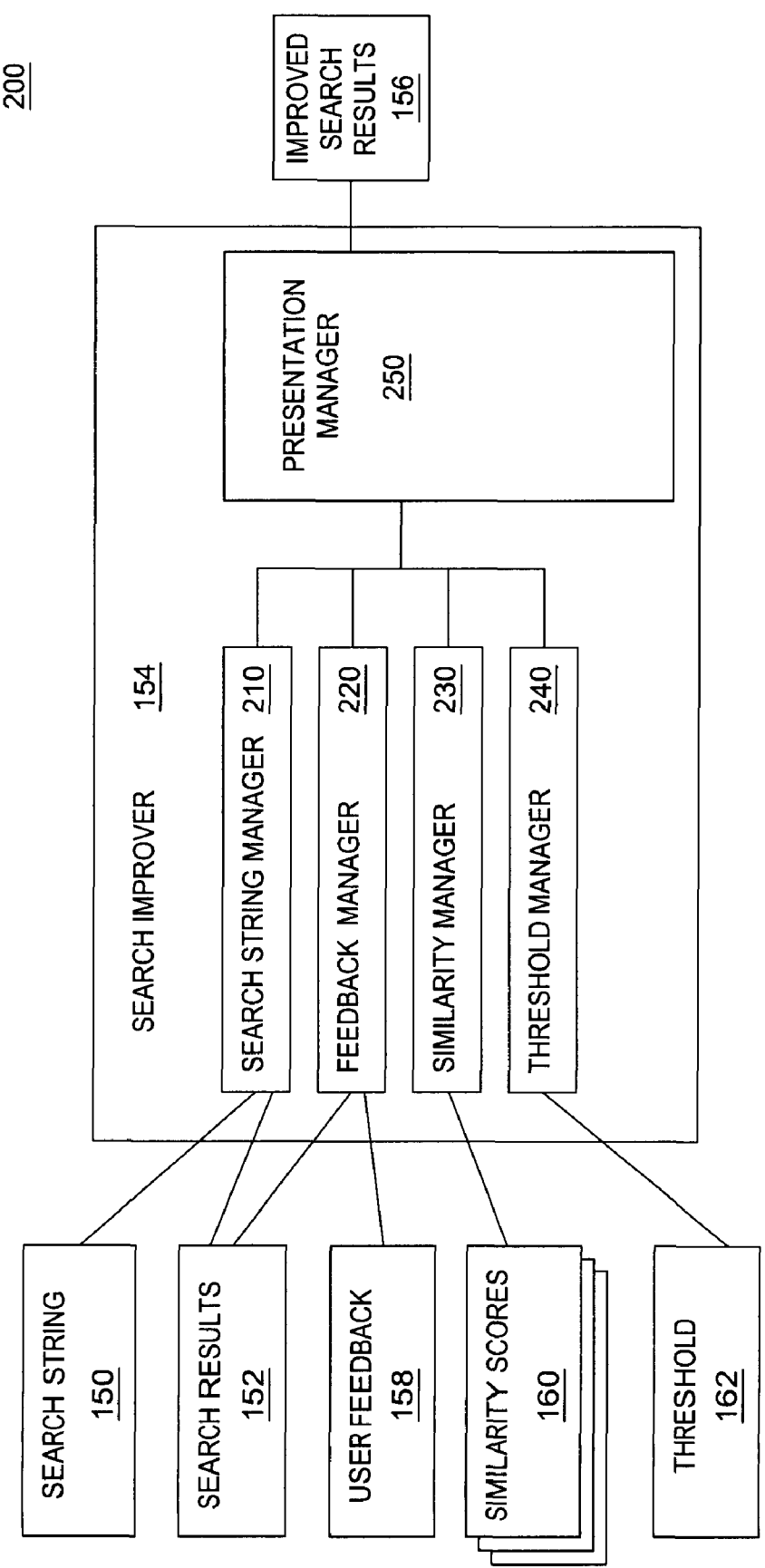
FIG. 2 is a block diagram illustrating components of a search improver, according to one embodiment of the invention.

FIG. 2 is a block diagram 200 illustrating components of the search improver 154 of FIG. 1, according to one embodiment of the invention. As shown, the search improver 154 includes a search string manager 210, a feedback manager 220, a similarity manager 230, a threshold manager 240, and a presentation manager 250. In one embodiment, the search improver 154 includes a statistical classifier which may be trained using a set of documents from an initial set of search results selected by a user.

In one embodiment, the search string manager 210 receives a search string 150. The search string 150 may be received from a user. Table I shows an example of search string 150:

TABLE I

Search string example

| Search string: | Saturn |

In this specific example, the user desires to search a corpus of documents to find a plurality of documents that include the search term "Saturn." In one embodiment, the search improver 154 provides search results 152 based on the search string 150. For example, the search improver 154 may execute a query against the corpus of documents using the search string 150 to identify documents containing an occurrence of the search string 150 (i.e., the term "Saturn". Alternatively, the search improver 154 may receive the search results 152 from another application (such as a search engine). Table II shows an example of search results for the search string 150 "Saturn:"

TABLE II

Search results example

| Search results for: | Saturn |
|---|---|
| Number of documents in search results: | 1,000,000 |
| Results: | Document D1 (describing a planet) |
| | Document D2 (describing a car) |
| | Document D3 (describing a planet) |
| | Document D4 (describing a video game console) |
| | Document D5 (describing a car) |
| | Document D6 (describing a Roman God) |
| | Document D7 (describing a video game console) |
| | Document D8 (describing a planet) |
| | ... |
| | Document D14 (describing a planet) |
| | ... |
| | Document D27 (describing a planet) |
| | ... |
| | Document D56 (describing a planet) |

In this example, assume that the search results go on to list a million documents in the search results 152, each of which contain the search string 150 "Saturn." Table II shows the first eight documents in the search result 152. As shown, documents D1, D3, and D8 describe a planet; documents D2 and D5 describe a car; document D4 describes a video game console; and document D6 describes a Roman God.

This simple example illustrates how, in many cases, not all of the documents in the search results 152 are going to be relevant to what the user is actually searching for. For example, the user may be interested in documents relating to the planet Saturn, as opposed to documents relating to cars sold under this same name (or vice versa). In this case, although relevant to what the user is searching for, D27 and D56 are ranked relatively low in the search results. In one embodiment, the feedback manager 220 receives user feedback 158. A user may provide feedback 158 regarding some of the documents in the search results 152. Table III shows an example user feedback 158:

TABLE III

User feedback example

| Selected document | Feedback |
|---|---|
| Document D1 (planet) | Relevant |
| Document D3 (planet) | Relevant |

In this specific example, the user provides feedback 158 for two documents (namely, D1 and D3) selected from the search results 152. As shown, the feedback 158 specifies that documents D1 and D3 are relevant to what the user is actually searching for. For example, search results 152 may be presented to the user with a checkbox associated with each document in the search results 152—allowing the user to indicate whether a given document in the results is "relevant." A user may then specify relevant documents by checking the checkboxes next to D1 and D3, respectively, and clicking a button labeled "Improve these search results based on the selected relevant documents." That is, the user requests the search improver 154 to improve the search results 152 by returning documents of the search results 152 that are similar to selected "relevant" documents.

In another embodiment, the search improver 154 may track user clicks (from an input device 114, such as a mouse) on the search results 152. After a predefined number of user clicks, the search improver 154 may ask the user (e.g., via a dialogue box) whether the user desires to improve the search results 152 based on the selected documents (i.e., the documents in the search results 152 clicked on by the user). If so, the search improver 154 may further ask the user to provide feedback 158 on the selected documents (such as whether the selected documents were relevant, etc.).

In one embodiment, the feedback 158 may also specify documents that are not relevant to what the user is actually searching for. For example, search results may be presented with two checkboxes associated with (e.g., next to) each document in the search results 152. A user may then specify whether each document is relevant (or not) by selecting the appropriate checkbox. In effect, the user requests the search improver 154 to improve the search results 152 by returning only documents of the search results 152 that are similar to the selected "relevant" documents but that are also dissimilar to the selected "irrelevant" documents.

Alternatively, the user could provide a similarity score. For example, suppose a user provides feedback 158 that specifies three relevant documents from the search results 152. The search improver 154 may ask the user to further rate each of the three relevant documents. For instance, the similarity score may be a number from one to ten, with ten being the highest. As another example, the similarity score may be a user selection of as "high", "medium", and "low", etc.

In one embodiment, the similarity manager 230 computes a similarity score 160 for each of the plurality of documents in the search results 152 based on the user feedback 158. In one embodiment, the similarity manager 230 may include a classifier trained using the documents selected by a user. For example, each document identified by the user as being relevant may be supplied as input to an untrained classifier as a positive training example. Similarly, if documents are identified as being not relevant, such documents may be supplied as input to the classifier as a negative training example. In one embodiment a naïve Bayes classifier may be used. Alternatively, other techniques such as a linear classifier, Latent Semantic Indexing, and artificial neural networks may be used. Of course, other classification approaches may be used as well.

Once trained, the classifier may be configured to identify whether a given input document "belongs" to a category of documents represented by the input set. For example, the classifier may be configured to receive an input document and return a measure of similarity indicating a "likeness" between the input document and the documents used to train the classifier. For example, the trained classifier may be supplied each document in the initial set of search results. In such a case, the trained classifier outputs a score representing a measure of how much each input document is "like" the ones used to train the classifier, i.e., whether the input document should be considered a member of the category of documents learned by the classifier from the training set. Documents receiving a similarity score above a specified threshold may be bumped to the top of the search results. Alternatively, documents falling below the threshold may simply be excluded from the search results entirely. In such a case, the statistical classifier computes overall similarity scores, and the search improver 154 receives overall similarity scores from the statistical classifier.

In one embodiment, the threshold manager 240 provides a threshold 162. The threshold 162 may specify a minimum value for a similarity score. The improved search results 156 may re-rank the initial search results such that documents having a similarity score output by the classifier above the threshold 162 are ranked at the top of the results. In one embodiment, the threshold 162 may also be configured by a user. Other criteria for re-ranking search results based on how the classifier evaluates the initial search results are broadly contemplated. For example, the threshold may also specify to re-rank documents with the highest top ten percent of the similarity scores at the top of the search results. That is, the improved search results 156 may include documents of the search results 152 having an overall similarity score in the top ten percent (among documents in the search results 152). Alternatively, documents with a score assigned by the classifier that does not exceed the threshold may be excluded from the re-ranked search results entirely. Further, the threshold 162 may also specify a maximum number of documents to re-rank in the search results. For example, the improved search results 156 may re-rank the initial search results to include first ten documents having a measure of similarity assigned by the classifier which exceeds the threshold 162. Such a threshold may be applied to a search result having a large number of documents to improve response time (i.e., by not necessarily having to process the complete set of documents in the initial search result).

In one embodiment, the presentation manager 250 generates improved search results 156 based on the search results 152, the user feedback 158, the similarity scores 160, and the threshold 162. Further, the presentation manager may output the improved search results 156 to an output device 116, such as a graphical display device. Table IV shows an example of improved search results 156:

TABLE IV

Improved search results example

| Improved search results for: | "Saturn" |
|---|---|
| Results: | Document D1 (describing a planet) |
| | Document D3 (describing a planet) |
| | Document D8 (describing a planet) |
| | Document D14 (describing a planet) |
| | Document D27 (describing a planet) |
| | Document D56 (describing a planet) |
| | ... |

As shown, the improved search results 156 for the search string 150 "Saturn" have re-ranked six documents from the initial search results shown in Table II. Unlike the initial ranking of the results shown in Table II, the documents initially ranked fourteenth, twenty-seventh, and fifty-sixth are now ranked at the top of the results.

In one embodiment, once the improved search results 156 are generated, the search improver 154 may also tag each document of the improved search results 156 with terms of the search string 150. These tags may be used to improve future searches over the corpus of documents (by the user and/or by other users). For example, the search improver 154 may tag each document of the improved search results shown in the example of Table IV with a tag "Saturn". The tags may be stored in permanent storage, such as the storage 108. The search improver 154 may use such tags to further improve search results. For example, for a search string 150 of "Saturn", a search engine may generate search results 152 that lists a document tagged with "Saturn" above a document without tags (even though both documents contain the term "Saturn").

Figure 3:
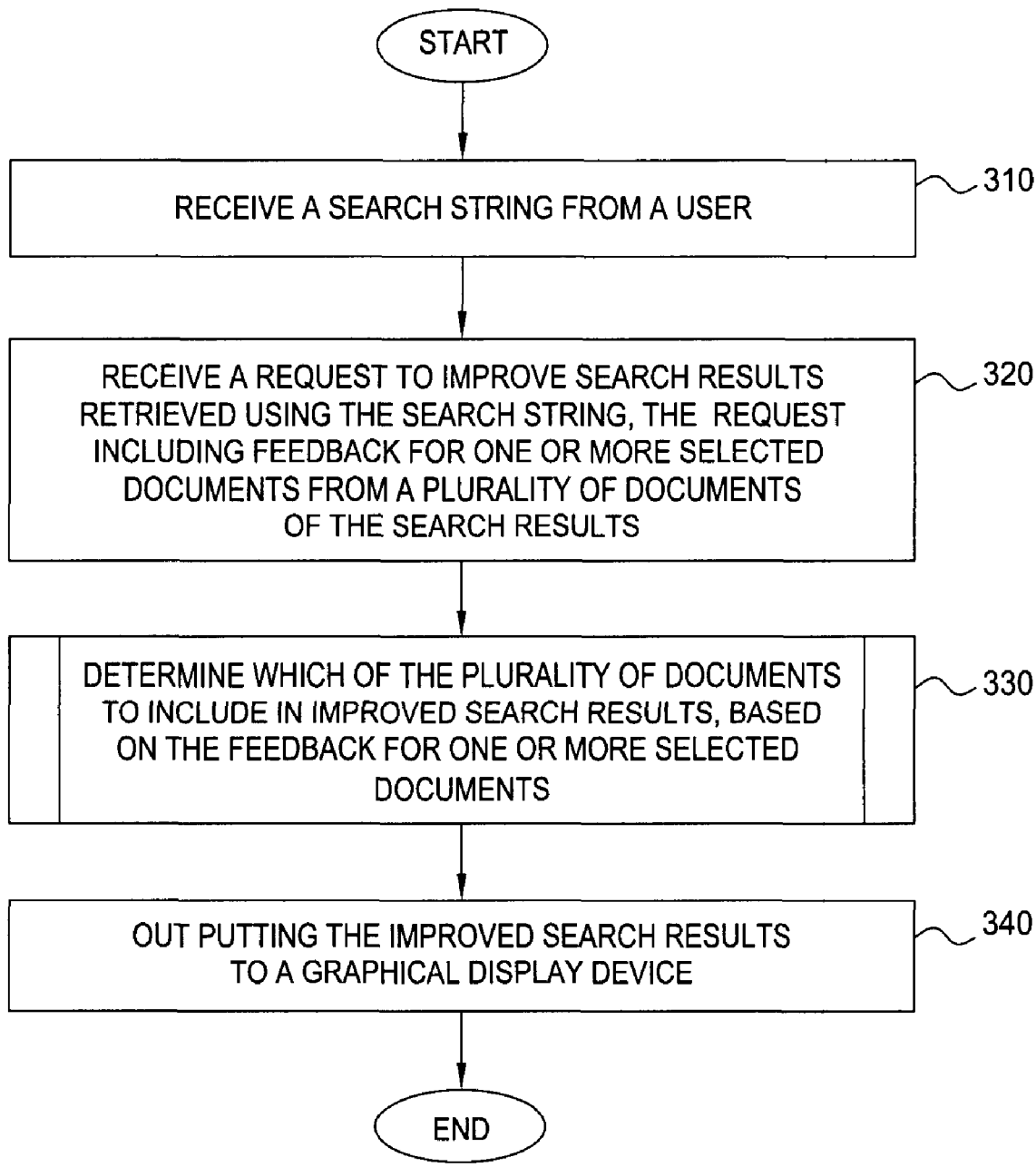
FIG. 3 is a flowchart depicting a method for improving search results based on user feedback, according to one embodiment of the invention.

FIG. 3 is a flowchart depicting a method 300 for improving search results 152 based on user feedback 158, according to one embodiment of the invention.

As shown, the method 300 begins at step 310, where the search string manager 210 receives a search string 150 from a user. For example, the search string manager 210 may receive the search string of "Saturn" Table I. At step 320, the feedback manager 220 may receive a request to improve search results 152 retrieved using the search string 150. Such a request may include feedback regarding documents from the initial search results 152.

At step 330, the presentation manager 250 may determine which of the plurality of documents to include in the improved search results 156, based on the feedback regarding the documents included in the initial search results. For example, as noted above, the search improver 154 may use the feedback indicating which documents were useful (and optionally which documents were not useful) to train a statistical classifier. The presentation manager 250 may then use output from the trained statistical analyzer (i.e., in evaluating the documents of the search results 152) to re-rank the documents in the improved search results 156. Step 330 is further described below in conjunction with FIG. 4. At step 340, the presentation manager 250 may output the improved search results for display on output device 116.

Figure 4:
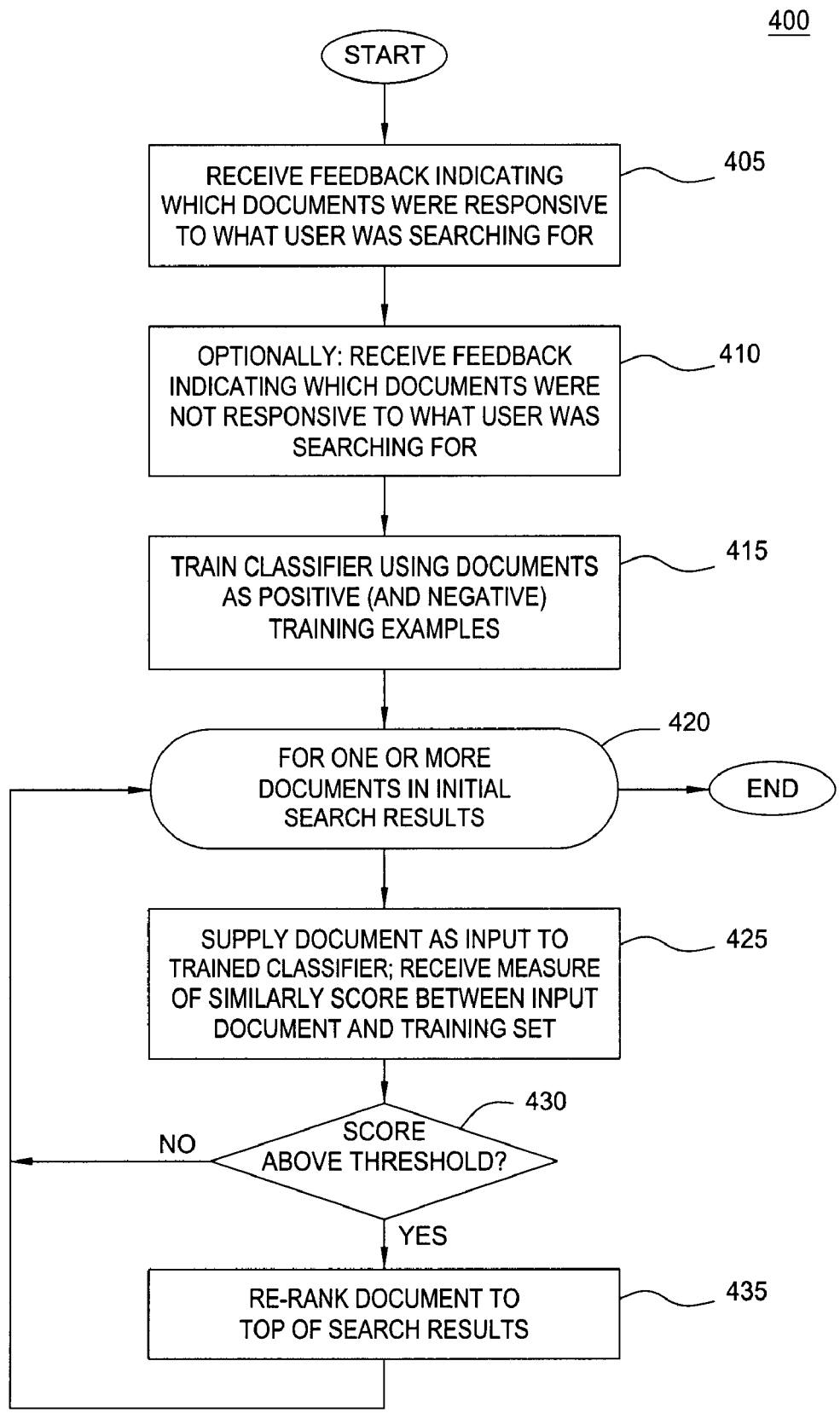
FIG. 4 is a flowchart depicting a method for evaluating a plurality of documents in search results based on user feedback, according to one embodiment of the invention.

FIG. 4 is a flowchart depicting a method 400 for evaluating documents in an initial set of search results, based on user feedback, according to one embodiment of the invention. As noted, the initial search results maybe ranked according to an initial ordering selected by the search engine. Following the user providing a selection of items in the search results which were useful (or not useful), a classifier may be trained using these as a training set. Thereafter, the classifier may evaluate other documents in the search results, re-ranking ones which are scored by the classifier as a match to a category represented by the training examples.

As shown, the method 400 begins at step 405 where the search improver 154 receives feedback from the user indicating what documents in the initial search results were actually responsive to what the user was searching for. Similarly, at step 410, the search improver 154 may receive feedback from the user indicating what documents in the initial search results were not responsive to what the user was searching for. For example, as described above, the initial search results may be presented with graphical interface elements (e.g., checkboxes) used to select which documents were (and which documents were not) responsive to the users search request. Alternatively, the search improver 154 may monitor which entries the user selects from the initial search results. After the user has viewed a specified number of entries (e.g., 5-10), the search improver 154 may prompt the user to identify which of the viewed entries included content relevant to what the user was actually looking for.

However identified, the search improver 154 receives an indication of documents from the initial search results that were relevant (and optionally, documents that were not). At step 415, the search improver 154 trains a classifier using the documents identified at steps 405 and 410 as positive (and negative) training examples. The documents used to train the classifier represent a category—and the classifier may evaluate input documents to determine whether the input document is a member of the category. In one embodiment, this may be a binary result.

Alternatively, the classifier may output a value representing how strongly the input document "matches" the category. If the value exceeds a configurable threshold, then the input document is considered a member of the category. In the present context, as the training set represents examples of search results that were (or were not) relevant to what the user was searching for, documents the classifier decides match this category are re-ranked in the search results presented to the user.

Returning to the method 400, a loop begins at step 420 where the classifier evaluates a collection of documents. For example, the classifier may evaluate each document in the initial search results (excluding the documents from the training set). However, the documents evaluated by the trained classifier need not be limited to documents form the initial search results. Doing so may be useful to identify documents that were not in the initial search results because they lacked one of the search terms but are nevertheless consistent with the category of documents the classifier is trained to recognize (e.g., a document providing a description of the moons of "the ringed planet" that never referred to the name "Saturn").

At step 425, the search improver 154 supplies a document as input to the trained classifier and, in response, receives a measure of similarity score between the input document and the training set. As noted, the score represents how well the input document "matches" a category represented by the documents used to train the classifier.

At step 430, if the score is above a threshold, then at step 435 that document is re-ranked to the top of the search results. Note, the document need not be re-ranked to the first position of the search results. In one embodiment, the search improver 154 may maintain the original ranking of the document, relative to others that belong to the category recognized by the classifier. For example, Table IV lists documents ordered by D1, D3, D8, D14, D27, D56. This ordering preserves the initial ranking, but moves all documents relevant to what the user is actually searching for to the head of the search results. Of course, other approaches to re-ranking documents evaluated by the classifier may be used.

Once the group of documents is evaluated, the user may be presented with the re-ranked search results. As noted above, the re-ranked search results may include only the documents identified by the classifier as belonging to the category represented by the documents used to train the classifier. Alternatively, the re-ranked search results may include the complete collection of documents listed in the initial search results—with the ones identified by the classifier as being relevant to what the user is looking for ranked at the head of the search results.

Further, the method 400 may be performed iteratively. For example, once the classifier of the search improver 154 identifies and re-ranks certain documents in the initial search results, the user may again identify documents in the re-ranked search results which were responsive to what the user was looking for. These documents (initially evaluated by the classifier) may be used as additional (positive or negative) training examples. Doing so may help improve the accuracy of the classifier—especially for large document sets.

Of course, the embodiments described herein are intended to be illustrative and not limiting of the invention, and other embodiments are broadly contemplated. Those skilled in the art will recognize, for example, that embodiments of the invention may be adapted to support a variety of classification techniques for training a classifier and for evaluating a group of documents using the trained classifier. Further, although embodiments are described herein with reference to a search improver that executes on a computer 102, those skilled in the art will recognize that embodiments of the invention may be adapted to support a search improver that runs on multiple computers (e.g., a search improver that partially runs on a server computer and partially runs on a client computer). Further still, although embodiments are described herein with reference to a search improver that is a standalone application; those skilled in the art will recognize that embodiments of the invention may be supported by forms of the search improver other than a standalone application (e.g., a search improver integrated into a search engine application).

Advantageously, embodiments of the invention may be used to dynamically generate search results based on user feedback. In one embodiment, a search improver receives a request to generate search results retrieved using a search string. Further, the request may include user feedback for one or more documents included in the search results. The search improver may generate search results based on the search results and the user feedback for one or more selected documents of the search results. The search improver may output the improved search results to a user via a graphical display device. Accordingly, a user may refine a search result by providing user feedback on one or more documents of the search result.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing search results, comprising:
receiving a search request against a corpus of documents, wherein the search request specifies one or more search terms;
generating an initial set of search results, wherein the initial set of search results identifies a plurality of documents responsive to the search request, ranked in an initial ordering, and wherein each of the plurality of documents contains text;

receiving user indication of: (i) at least one document relevant to the one or more search terms and (ii) at least one document irrelevant to the one or more search terms;

by operation of one or more computer processors, training a new statistical classifier using each relevant document as a positive training example to form a first category of documents recognized by the statistical classifier and using each irrelevant document as a negative training example to form a second category of documents recognized by the statistical classifier, wherein the at least one relevant document and the at least one irrelevant document form a training set for the new statistical classifier;

supplying each document in the initial set of search results and not in the training set, to the trained statistical classifier to obtain a measure of similarity between the respective document and at least one of the categories recognized by the trained statistical classifier;

supplying one or more documents from the corpus and not included in the set of initial search results, to the trained statistical classifier to obtain a measure of similarity between each of the one or more documents and at least one of the categories recognized by the trained statistical classifier;

re-ranking the initial set of search results based on the measures of similarity obtained from the trained statistical classifier, comprising ranking each document having a measure of similarity to the first category of documents that exceeds a first user-configurable threshold, ahead of each document having a measure of similarity to the second category of documents that exceeds a second user-configurable threshold; and outputting the re-ranked search results for display to a user.

2. The computer-implemented method of claim 1, wherein the selection of one or more documents from the plurality of documents is received in response to monitoring what documents referenced in the initial search results are accessed by the user and prompting the user to indicate whether each accessed document is relevant to what the user is searching for.

3. The computer-implemented method of claim 1, wherein the statistical classifier is one of a naïve Bayes classifier, a linear classifier, a latent semantic indexing classifier and an artificial neural network.

4. The computer-implemented method of claim 1, wherein the documents with similarity scores within a user-configurable percentile are re-ranked at the top of the search results.

5. The computer-implemented method of claim 4, wherein the number of documents that are re-ranked in the search results is limited by a user-configurable maximum count.

6. The computer-implemented method of claim 5, wherein each document in the re-ranked search results is tagged with the one or more search terms, and wherein the tags are stored for use in initially ordering search results responsive to subsequent search requests.

7. The computer-implemented method of claim 6, wherein the user indication of each document comprises a user-specified numerical score indicating an extent to which the user finds the respective document to be relevant to the one or more search terms, and wherein the new statistical classifier is trained using the user-specified numerical scores.

8. The computer-implemented method of claim 7, further comprising:

receiving user indication of, from the re-ranked search results: (i) one or more documents relevant to the one or more search terms and (ii) one or more documents irrelevant to the one or more search terms;

using the one or more relevant documents and the one or more irrelevant documents to further train the new statistical classifier to recognize the first category of documents and the second category of documents, respectively, wherein the training set, the one or more relevant documents, and the one or more irrelevant documents together form an augmented training set;

supplying each document in the re-ranked search results and not in the augmented training set, to the further-trained statistical classifier to obtain a measure of similarity between the respective document and at least one of the categories recognized by the trained statistical classifier;

supplying one or more documents from the corpus and not included in the set of re-ranked search results, to the further-trained statistical classifier to obtain a measure of similarity between each of the one or more documents and at least one of the categories recognized by the trained statistical classifier;

ranking yet again the re-ranked search results based on the measures of similarity obtained from the further-trained statistical classifier, comprising ranking each document having a measure of similarity to the first category of documents that exceeds the first user-configurable threshold, ahead of each document having a measure of similarity to the second category of documents that exceeds the second user-configurable threshold; and outputting the yet-again-ranked search results for display to the user.

9. A computer program product, the computer program product comprising a computer usable storage medium having computer usable program code for processing search results, the code being configured for:

receiving a search request against a corpus of documents, wherein the search request specifies one or more search terms;

generating an initial set of search results, wherein the initial set of search results identifies a plurality of documents responsive to the search request, ranked in an initial ordering, and wherein each of the plurality of documents contains text;

receiving user indication of: (i) at least one document relevant to the one or more search terms and (ii) at least one document irrelevant to the one or more search terms;

by operation of one or more computer processors when executing the computer usable program code, training a new statistical classifier using each relevant document as a positive training example to form a first category of documents recognized by the statistical classifier and using each irrelevant document as a negative training example to form a second category of documents recognized by the statistical classifier, wherein the at least one relevant document and the at least one irrelevant document form a training set for the new statistical classifier;

supplying each document in the initial set of search results and not in the training set, to the trained statistical classifier to obtain a measure of similarity between the respective document and at least one of the categories recognized by the trained statistical classifier;

supplying one or more documents from the corpus and not included in the set of initial search results, to the trained statistical classifier to obtain a measure of similarity between each of the one or more documents and at least one of the categories recognized by the trained statistical classifier;

re-ranking the initial set of search results based on the measures of similarity obtained from the trained statistical classifier, comprising ranking each document having a measure of similarity to the first category of documents that exceeds a first user-configurable threshold, ahead of each document having a measure of similarity to the second category of documents that exceeds a second user-configurable threshold; and outputting the re-ranked search results for display to a user.

10. The computer program product of claim 9, wherein the selection of one or more documents from the plurality of documents is received in response to monitoring what documents referenced in the initial search results are accessed by the user and prompting the user to indicate whether each accessed document is relevant to what the user is searching for.

11. The computer program product of claim 9, wherein the statistical classifier is one of a naïve Bayes classifier, a linear classifier, a latent semantic indexing classifier and an artificial neural network.

12. The computer program product of claim 9, wherein the documents with similarity scores within a user-configurable percentile are re-ranked at the top of the search results.

13. The computer program product of claim 12, wherein the number of documents that are re-ranked in the search results is limited by a user-configurable maximum count.

14. The computer program product of claim 13, wherein each document in the re-ranked search results is tagged with the one or more search terms, and wherein the tags are stored for use in initially ordering search results responsive to subsequent search requests.

15. The computer program product of claim 14, wherein the user indication of each document comprises a user-specified numerical score indicating an extent to which the user finds the respective document to be relevant to the one or more search terms, and wherein the new statistical classifier is trained using the user-specified numerical scores.

16. The computer program product of claim 15, wherein the code is further configured for:

receiving user indication of, from the re-ranked search results: (i) one or more documents relevant to the one or more search terms and (ii) one or more documents irrelevant to the one or more search terms;

using the one or more relevant documents and the one or more irrelevant documents to further train the new statistical classifier to recognize the first category of documents and the second category of documents, respectively, wherein the training set, the one or more relevant documents, and the one or more irrelevant documents together form an augmented training set;

supplying each document in the re-ranked search results and not in the augmented training set, to the further-trained statistical classifier to obtain a measure of similarity between the respective document and at least one of the categories recognized by the trained statistical classifier;

supplying one or more documents from the corpus and not included in the set of re-ranked search results, to the further-trained statistical classifier to obtain a measure of similarity between each of the one or more documents and at least one of the categories recognized by the trained statistical classifier;

ranking yet again the re-ranked search results based on the measures of similarity obtained from the further-trained statistical classifier, comprising ranking each document having a measure of similarity to the first category of documents that exceeds the first user-configurable threshold, ahead of each document having a measure of similarity to the second category of documents that exceeds the second user-configurable threshold; and outputting the yet-again-ranked search results for display to the user.

17. A system, comprising:

one or more computer processors; and a memory containing an application program configured for processing search results, which, when executed by the one or more computer processors is configured to perform an operation comprising:

receiving a search request against a corpus of documents, wherein the search request specifies one or more search terms;

generating an initial set of search results, wherein the initial set of search results identifies a plurality of documents responsive to the search request, ranked in an initial ordering, and wherein each of the plurality of documents contains text;

receiving user indication of: (i) at least one document relevant to the one or more search terms and (ii) at least one document irrelevant to the one or more search terms;

training a new statistical classifier using each relevant document as a positive training example to form a first category of documents recognized by the statistical classifier and using each irrelevant document as a negative training example to form a second category of documents recognized by the statistical classifier, wherein the at least one relevant document and the at least one irrelevant document form a training set for the new statistical classifier;

supplying each document in the initial set of search results and not in the training set, to the trained statistical classifier to obtain a measure of similarity between the respective document and at least one of the categories recognized by the trained statistical classifier;

supplying one or more documents from the corpus and not included in the set of initial search results, to the trained statistical classifier to obtain a measure of similarity between each of the one or more documents and at least one of the categories recognized by the trained statistical classifier;

re-ranking the initial set of search results based on the measures of similarity obtained from the trained statistical classifier, comprising ranking each document having a measure of similarity to the first category of documents that exceeds a first user-configurable threshold, ahead of each document having a measure of similarity to the second category of documents that exceeds a second user-configurable threshold; and outputting the re-ranked search results for display to a user.

18. The system of claim 17, wherein the selection of one or more documents from the plurality of documents is received in response to monitoring what documents referenced in the initial search results are accessed by the user and prompting the user to indicate whether each accessed document is relevant to what the user is searching for.

19. The system of claim 17, wherein the statistical classifier is one of a naïve Bayes classifier, a linear classifier, a latent semantic indexing classifier and an artificial neural network.

20. The system of claim 17, wherein the documents with similarity scores within a user-configurable percentile are re-ranked at the top of the search results.

21. The system of claim 20, wherein the number of documents that are re-ranked in the search results is limited by a user-configurable maximum count.

22. The system of claim 21, wherein each document in the re-ranked search results is tagged with the one or more search terms, and wherein the tags are stored for use in initially ordering search results responsive to subsequent search requests.

23. The system of claim 22, wherein the user indication of each document comprises a user-specified numerical score indicating an extent to which the user finds the respective document to be relevant to the one or more search terms, and wherein the new statistical classifier is trained using the user-specified numerical scores.

24. The system of claim 23, wherein the operation further comprises:

receiving user indication of, from the re-ranked search results: (i) one or more documents relevant to the one or more search terms and (ii) one or more documents irrelevant to the one or more search terms;

using the one or more relevant documents and the one or more irrelevant documents to further train the new statistical classifier to recognize the first category of documents and the second category of documents, respectively, wherein the training set, the one or more relevant documents, and the one or more irrelevant documents together form an augmented training set;

supplying each document in the re-ranked search results and not in the augmented training set, to the further-trained statistical classifier to obtain a measure of similarity between the respective document and at least one of the categories recognized by the trained statistical classifier;

supplying one or more documents from the corpus and not included in the set of re-ranked search results, to the further-trained statistical classifier to obtain a measure of similarity between each of the one or more documents and at least one of the categories recognized by the trained statistical classifier;

ranking yet again the re-ranked search results based on the measures of similarity obtained from the further-trained statistical classifier, comprising ranking each document having a measure of similarity to the first category of documents that exceeds the first user-configurable threshold, ahead of each document having a measure of similarity to the second category of documents that exceeds the second user-configurable threshold; and outputting the yet-again-ranked search results for display to the user.

* * * * *